United States Patent [19]

Rysti

[11] 4,274,781

[45] Jun. 23, 1981

[54] METHOD AND APPARATUS FOR PACKING TIMBER

[76] Inventor: Alpo Rysti, Friisilantie 36, 02240 Espoo 24, Finland

[21] Appl. No.: 67,007

[22] Filed: Aug. 16, 1979

[30] Foreign Application Priority Data

Jun. 15, 1979 [FI] Finland .................................. 791913

[51] Int. Cl.$^3$ .............................................. B65G 57/10
[52] U.S. Cl. ................................................... 414/83
[58] Field of Search ....................... 414/83, 84, 87, 80; 221/270, 274

[56] References Cited

U.S. PATENT DOCUMENTS

| | | | |
|---|---|---|---|
| 2,730,247 | 1/1956 | Lawson | 414/83 |
| 3,610,443 | 10/1971 | Brumunddal et al. | 414/83 |
| 4,057,150 | 11/1977 | Lunden | 414/83 |

FOREIGN PATENT DOCUMENTS 42188  2/1970  Finland .

Primary Examiner—Stanley H. Tollberg
Attorney, Agent, or Firm—Fitzpatrick, Cella, Harper & Scinto

[57] ABSTRACT

Timber packing apparatus and method are disclosed wherein a timber mat is transferred from a delivery conveyor to a lift by structural elements which raise the mat or a selected portion thereof, shift it longitudinally and lower it, the elements being so arranged that the longitudinal movement is independent of its other movements thus to minimize the mass forces of the moving parts.

14 Claims, 6 Drawing Figures

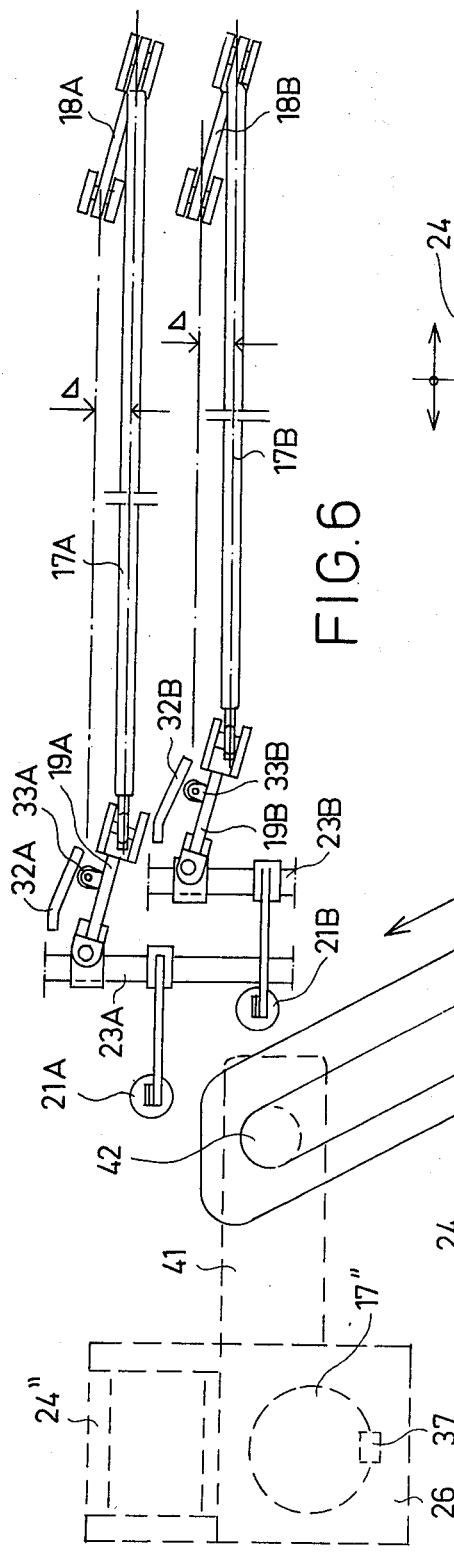
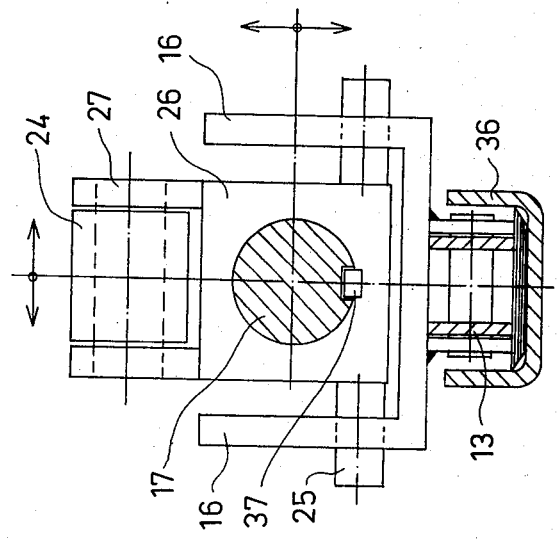
FIG. 4
FIG. 5
FIG. 6

METHOD AND APPARATUS FOR PACKING TIMBER

BACKGROUND OF THE INVENTION

1. Field of the Invention

The present invention relates to a method and apparatus for packeting timber, according to which method, a conveyor delivers the timber in the form of a mat, and the mat, or part of it, is then moved by means of a set of transfer arms to a timber lift, after which the transfer arm set is removed to its initial position.

For carrying out the above procedure, the invention also relates to apparatus that comprises a timber lift with supporters, upon which the timber packet is formed and which are made to descend as the timber packet accumulates on the supporters, by means of a particular device which comprises a traverse conveyor, on which the timber is brought in the form of a mat near the packeting lift, and one or more sets of oblong transfer arms, which reciprocate from under the conveying level of said traverse conveyor upon the timber lift that moves timber layers in order to push same on to the timber lift.

2. Description of the Prior Art

There are several previously known procedures and devices for packeting timber. For instance, I am aware of a procedure and device in which timber is collected onto a traverse conveyor in the form of a one-layer mat, from which parts of certain width are separated to be transferred with reciprocating transfer arms to a packeting lift, where layers are positioned on top of each other in order to form a packet. For providing room for the next layer, the lift is made to lower according to a program as layers of the packet are accumulated on the supporting arms of the lift. Depending on whether the timber to be packeted is dry or fresh, laths can be inserted between timber layers for improving drying and/or ensuring the holding together of the packet.

The capacities of timber handling equipment have recently been increasing. This has had an effect on the capacity requirements of timber packeting machinery. It has been observed that a factor reducing the efficiency of timber packeting machines is the relatively high masses of the reciprocating transfer arms, and consequent high mass forces when moving said transfer equipment back and forth while at the same time raising and lowering them.

SUMMARY OF THE INVENTION

I have conceived and contribute by the present invention a procedure and equipment by which I am able to overcome the foregoing difficulties and disadvantages and by means of which the reciprocating masses are made considerably smaller.

For attaining the objectives mentioned above and to be expressed later, the principal characteristic feature of a procedure in accordance with the present invention resides in the fact that the arms of the transfer arm set or sets are made to move longitudinally with separate actuators, independently as to the up-and-down movement, the longitudinal reciprocation of the arms being provided by the linear movement of an actuator, and the up-and-down movement of the arms being provided by the rotating movement of another actuator, these movements being made independent of each other by means of a glide fit in the mounting component of the arm set.

The principal characteristic feature of an apparatus in accordance with the present invention resides in the fact that the timber transfer arms are, at ends opposite to those of the timber lift side, fastened to a gliding block, carriage or similar element installed on guides so as to move on these, that said guides are, at their ends, pivoted to turning arms, and that the gliding block or similar member is carried on a belt conveyor or the like along the guides, and that, between the guide block and the conveyor there is a glide fit.

In a procedure and device in accordance with the invention, the reciprocating masses are made smaller than heretofore by providing the transfer arm movement without vertical beam systems and by arranging the transfer chains, or the like, for reciprocating movement only, while the up-and-down movement of the transfer arms is provided by a rotary movement, preferably by means of only one lever and actuator throughout the whole system. In accordance with the invention, the rotary movement is made to raise and lower the transfer arms vertically, allowing their mounting to glide in a particular guide fit during the up-and-down movement. Furthermore, in accordance with one embodiment of the invention, the transfer arms are, during the lowering phase, made to move sideways. With this movement the ends of the pieces of a timber layer are brought flush against a stopper for evening up eventual irregularities at the edge of the layer resulting from the fact that the timber pieces may move slightly on the transfer arms.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIG. 4 is a horizontal sectional view illustrating the guides and their transporting chains;

FIG. 5 is a horizontal sectional view of an alternative arrangement of the transporting chain and guide arms; and FIG. 6 is a diagrammatic plan view of such an embodiment of the invention in which there are two transfer arm sets that operate alternately.

DESCRIPTION OF THE PREFERRED EMBODIMENT

Figure 1:
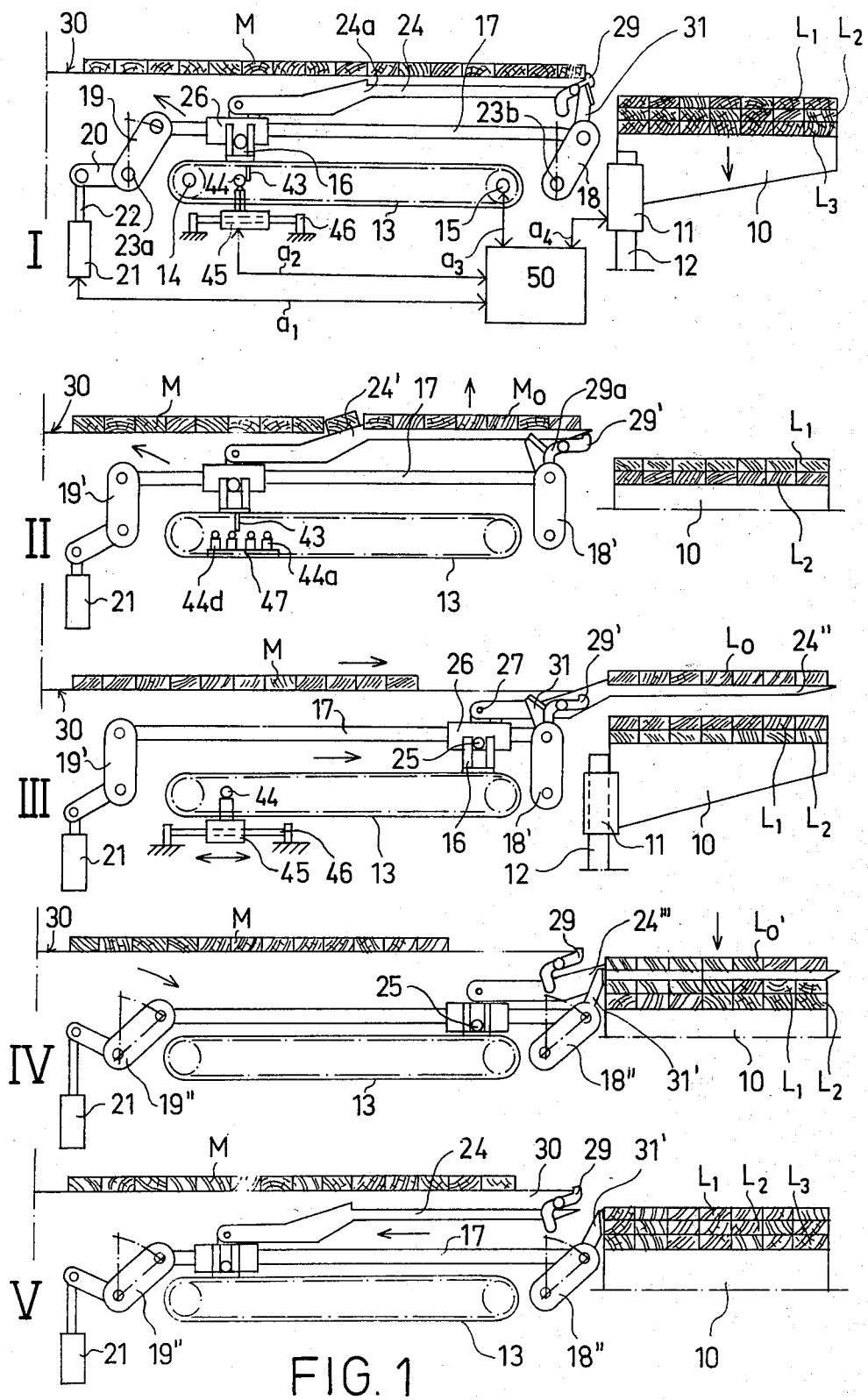
FIG. 1 is a diagrammatic side view of operational phases I, II, III, IV and V of a device in accordance with the invention.
Figure 2:
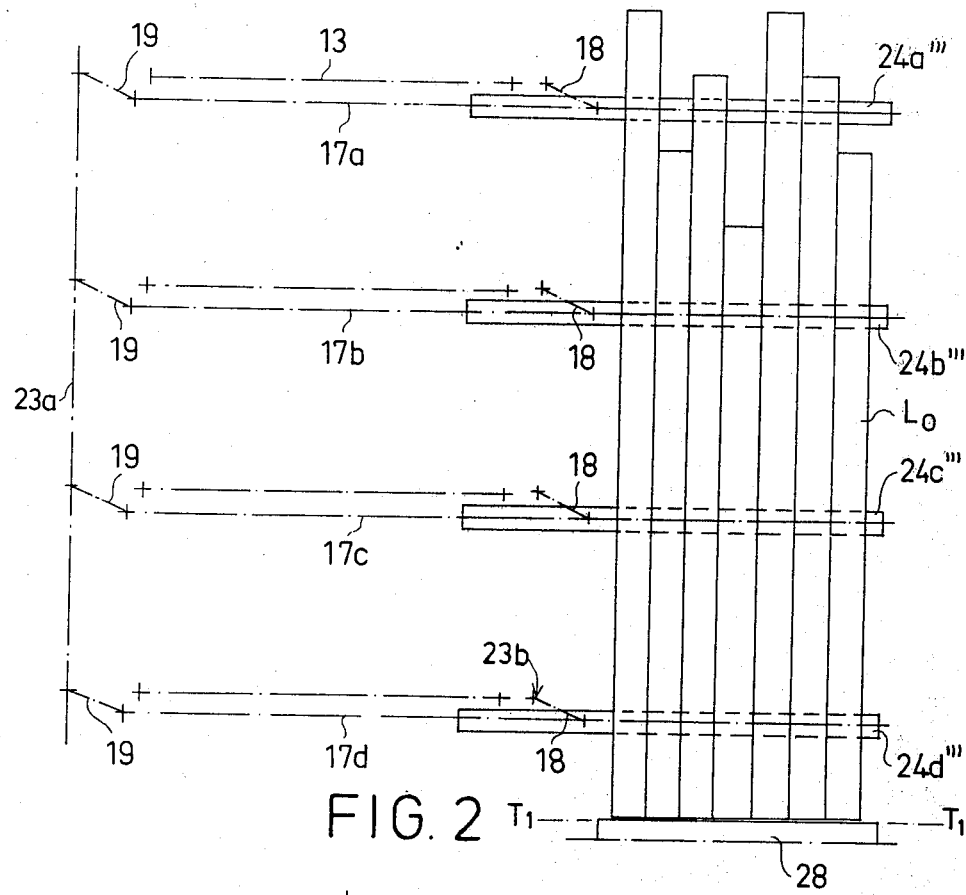
FIG. 2 is a diagrammatic plan view of a device in accordance with the invention in the phase of operation in which the transfer arms have been pushed along their guides on top of the packet to be formed on the timber lift.

The timber packeting device shown in FIG. 1 comprises a lift device, known as such, comprising two adjacent supporting arms 10 fastened to gliding blocks 11 which move vertically on guides 12 by means of actuators known as such. Near lift device 10, 11, 12 there is a traverse conveyor 30 which transports timber pieces in the form of a mat M above transfer arms 24. There are, for instance, four transfer arms 24 spaced side by side, as shown in FIG. 2 (transfer arms 24a, 24b, 24c and 24d). At 27, transfer arms 24 are attached to gliding blocks 26, mounted, for instance, on cylindrical guides 17. In the guides there are grooves for receiving keys 37 (FIGS. 4 and 5) in order to prevent gliding blocks 26 from rotating relatively to the guides.

Figure 3:
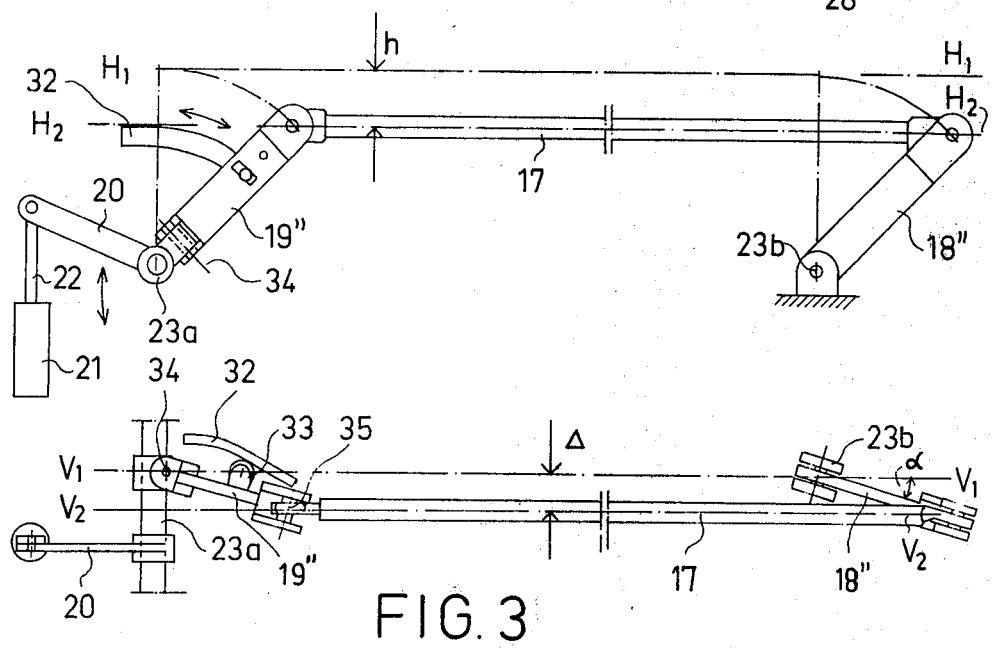
FIG. 3 illustrates the turning arms and the guides on top of them as seen from the side and from above.

On both sides of gliding blocks 26 there are transfer pins 25 fitting in slots of fork 16, as shown in FIGS. 1 and 4. Fork 16 is driven reciprocatingly by belt conveyor 13 reeved about pulleys 14 and 15. Each transfer arm 24a, 24b, 24c and 24d is mounted on a guide 17a, 17b, 17c, 17d, respectively, as shown in FIG. 2. Guides 17 are mounted on rotatable arms 18 and 19. For instance, as shown in FIG. 3, arms 19 are attached to horizontal shaft 23a extending over the whole width of the device. Arms 19 are fastened by cross joints 34 to shafts 23a, while arms 18 are fastened to shafts 23b mounted to the frame of the device. The direction of arms 18, projected on the horizontal plane (FIG. 3) forms angle α with the direction of guides 17. At one end, guides 17 are fastened with spherical joint 35 to arms 19, and at the other end, by normal links to arms 18. On arms 19 there are rollers 33 that lean against guides 32 so that guide arms 18, 19 and the guides between them run along correct tracks. Pivot arm 20 is fastened to shaft 23a and the end of this arm 20 is fastened to piston rod 22 of hydraulic cylinder 21, by means of which arms 18 and 19 and the guides between said arms are made to move.

Having described above, in broad outline, the construction of a machine in accordance with the invention, I shall now describe, referring mainly to FIG. 1, the various phases of the operation of the machine, at the same time discussing more specifically some constructional details.

In accordance with phase I of FIG. 1, transfer arms 24 have, by means of chain conveyor 13, been moved to the back position, as viewed, to bring arms 24 underneath timber mat M that has been brought to position by traverse conveyor 30. At its front end, the timber mat is held in position by stoppers 29. As arms 18 and 19 are, from phase I of FIG. 1, turned counterclockwise to the vertical position, guide 17 rises, also causing the arms to rise to position 24', phase II, whereat part $M_o$ of timber mat M will be carried by arms 24', and the length of part $M_o$ is determined by shoulder 24e of transfer arms 24. As arms 18' turn to the vertical position corresponding to phase II of FIG. 1, the top ends of arms 18' simultaneously turn the dropping shaft part 29a of stoppers 29' so that part $M_o$ of the timber mat is free to move forward. In accordance with phase II, part $M_o$ of the timber mat has been raised so that it is no more supported by traverse conveyor 30.

When advancing from operational phase II to operational phase III, transfer arm set 24' has, driven by belt conveyor 13, glided in the direction of arms 24 to the position in which transfer arms 24" have moved to a position on top of packet $L_1$, $L_2$ formed on supporting arms 10. During this movement, turning arms 18', 18' do not move. In the next phase, conveyor 13 stops and turning arms 18' and 19' turn, driven by unit 21, around axles 23a, 23b, respectively to bottom position 18" and 19", whereat transfer arms 24" lower on top of the topmost layer $L_1$ of the timber packet to position 24''', and the timber layer on top of them to position $L_o'$. The lowering may be carried out so that transfer arms 24'''' lower directly downwards while gliding block 26 is, in the horizontal direction, locked into position as its pins 25 glide in slots 16 of conveyor 13 and as guide 17 glides in relation to gliding block 26. As the transfer arms lower to position 24''' described above, stopper 31, associated with the top ends of arms 18, turns against the side of the timber packet to position 31', where it holds timber layer $L_o'$ in position upon the timber packet. In phase V of the operation, arms 24 are moved by means of conveyor 13 as gliding block 26 simultaneously glides along guide 17, after which, by turning arms 18, 19, the various parts return to the positions of phase I, whereat traverse conveyor 30 has brought mat M against stopper set 29, and the phases described above can be repeated.

In accordance with FIG. 3, by turning arms 18 and 19, guides 17 are made to move vertically over the distance h between levels $H_1$ and $H_2$, which makes it possible to provide the necessary lowering and raising movement of transfer arms 24 independently from the longitudinal movement of those arms 24. As shown in the lower illustration of FIG. 3, by arranging the horizontal projection of transfer arms 18 and 19 to form an oblique angle α with the direction of guides 17, transfer arms 24 are made, as they turn from the vertical position (phase III of FIG. 1) to the lower position 18", 19", to move from vertical plane $V_1$ to vertical plane $V_2$ over distance Δ; and in this way, top layer $L_o$ of the timber packet can be made flush ($T_1$-$T_2$) against stopper 28 (FIG. 2).

As shown in FIG. 4, the chain of chain conveyor 13 moves in channel 36, and slotted fork 16 is attached to the chain. Gliding block 26 glides with a suitable fit in grooved guide 17; key 37 of the gliding block fitting into the groove and preventing the gliding block 26 and arms attached to it by pin 27 from rotating.

As shown in FIG. 5, horizontal arm 38 is attached to chain 13, and arm 39, slotted at 40, whose direction is obliquely upwards is fastened to horizontal arm 38. In slot 40 there is pin 42, which interconnects two flange couples 41 fastened to gliding block 27. Thus, as the arms 18 and 19 turn from the lower position to the top position, pin 32 moves in slot 40, and guide 17 is free to rise to the top position shown in phantom at 17", in which position the transfer arms are located at 24". This top position is limited by the top end of the slot 40.

As shown in FIG. 1, an impulse device installed in association with conveyor 13 comprises gliding block 45 fastened to guide 46. This gliding block comprises a microswitch 44 or similar impulse transmitter, and the triggering element is fastened to the conveyor belt. By moving gliding block 45 in the guide 46, the position of switch 44 can be adjusted. This adjustment changes the stroke of conveyor 13, i.e. the length of its linear movement and consequently, the width of the timber mat $M_o$ and the number of timber pieces constituting the mat. In FIG. 1, phase II, the corresponding function is realized with microswitches 44a–44d that are attached to frame 47. By making one of switches 44a–44d operative, the length of the linear movement of conveyor 13 can be adjusted step by step. The other end position of the reciprocating movement of conveyor 13 is fixed, as it is defined by the position of the timber lift.

Control and automatic equipment is schematically shown in FIG. 1 (phase I) as block 50. This equipment gives control impulses $a_1$ to the equipment, e.g. solenoid valves, which control the operation of hydraulic cylinder 21, and which provide impulse $a_2$ for the detection of one end position of conveyor 13, and which also provides impulse $a_3$ for the control of the drive motor of conveyor 13. Unit 50 also provides an impulse for controlling the lowering movement. This equipment comprises known control devices; therefore, a detailed description thereof is not necessary.

As shown in FIG. 6, there are two transfer arm sets, which operate alternatively. Each transfer arm set is fastened to its own guide 17A and 17B, which are, at their ends, pivoted to turning arms 18A, 19A; 18B, 19B. Arms 19A, 19B are rotated by shafts 23A, 23B and hydraulic cylinders 21A; 21B, and arms 19A; 19B are controlled by similar control equipment 32A, 33A, 32B, 33B.

I believe that the construction and operation of my novel apparatus for packing timber as well as the method disclosed herein will now be understood and that the several advantages thereof will be fully appreciated by those persons skilled in the art.

I claim:

1. A process for packeting timber, comprising; advancing the timber in the form of mat (M) with a conveyor (30), engaging said mat or a selected portion thereof by transfer means (24) and transferring said mat or said selected position thereof to timber lift means (10,11,12), and returning the transfer means to its initial position; wherein the movement of said transfer means includes raising of transfer arms, longitudinally reciprocatingly moving and lowering thereof, the longitudinal movement taking place independently of the raising and lowering movement in such a way that the longitudinal reciprocating movement takes place as a linear movement created by an actuator (13), and that the lowering and raising movement (24) takes place as a rotating movement created by actuators (18,19,20), said movements being independent of each other due to glide means (16,25 and 17,26) connected at one end of the transfer means.

2. A process in accordance with claim 1, wherein said transfer means (24) undergo a limited lateral movement ($\Delta$) for flushing up one end of the mat position ($M_o$) to be transferred to the timber packet ($L_1,L_2$) at the moment of lowering the timber layer ($L_o$) on the timber packet by pushing the end of the layer against a stopper (28).

3. A process in accordance with claims 1 or 2, including the steps of limiting the advance of the timber mat position prior to engaging same with said transfer means, and freeing said mat upon actuation of said actuators, so as to allow the longitudinal movement of the transfer means for transferring the timber mat.

4. A process in accordance with claim 1 including the step of retarding the topmost layer ($L_o'$) of the timber packet against return movement as the transfer means returns to its initial position.

5. A process in accordance with claim 2 including the step of retarding the topmost layer ($L_o'$) of the timber packet against return movements as the transfer means returns to its initial position.

6. A process in accordance with claim 3 including the step of retarding the topmost layer ($L_o'$) of the timber packet against return movements as the transfer means returns to its initial position.

7. A process in accordance with claim 1 wherein a plurality of transfer means operate alternately.

8. A process in accordance with claim 2, wherein a plurality of transfer means operate alternately.

9. A process in accordance with claim 3, wherein a plurality of transfer means operate alternately.

10. A process in accordance with claim 4, wherein a plurality of transfer means operate alternately.

11. Apparatus for packing timber including a timber lift (10,11,12) having supporters (10), upon which a timber packet is to be formed, and means for causing said lift to descend as the timber packet accumulates, said apparatus comprising a traverse conveyor (30), on which timbers are brought in the form of a mat (M) to a position near said lift, oblong transfer means (24), actuator means for effecting movement of said transfer means from beneath the conveying level of said traverse conveyor to transfer at least a portion of said mat to the timber lift; wherein the timber transfer means are fastened to glide means (26) at the end of said transfer means opposite the timber lift side, said glide means being mounted on guides (17) to move thereon, and conveyor means (13) connected to said glide means to move same along said guides, said apparatus further including turning arms (18,19) pivoted obliquely to the frame of the device and to said guides relative to the direction of movement of said glide means by a predetermined angle ($\alpha$) so that, as said arms rotate, said guides move sideways horizontally a given distance ($\Delta$), and stop means (28), whereby, upon movement of timber layer to ($L_o$) to said lift, the timbers constituting said mat are made flush against said stop means.

12. Apparatus in accordance with claim 11, including stopper means disposed at the output end of said traverse conveyor (30) to limit the advance of said mat thereon, said stopper means being in functional association with said turning arms to cause said turning arms, at one position thereof, to shift said stopper means to a position, in which the timber mat ($M_o$) is freed to be carried on by said transfer means.

13. Apparatus in accordance with claim 12, wherein there are, in the functional association with the turning arms, means (31), against which, as the turning arms reach a second position (18″), the side of timber layer ($L_o$), located on the lift, abuts, thus preventing the timber layer ($L_o$) from moving off the lift as the transfer means returns to its initial position.

14. Apparatus in accordance with claim 11, 12 or 13, including switch means (44a–44d) in association with said conveyor means, (44a–44d) by means of which the transfer distance of said chain means and consequently the width of the timber mat ($M_o$) can be adjusted.

* * * * *

UNITED STATES PATENT AND TRADEMARK OFFICE
CERTIFICATE OF CORRECTION

PATENT NO. : 4,274,781
DATED : June 23, 1981
INVENTOR(S) : ALPO RYSTI

It is certified that error appears in the above—identified patent and that said Letters Patent is hereby corrected as shown below:

Column 4, line 6, "18'" (second occurrence) should be --19'--; line 54, "27" should be --26--.

Claim 1, line 39, "position" should be --portion--.

Claim 14, line 62, after "-44d)" insert --13--.

Signed and Sealed this

Fifteenth Day of September 1981

[SEAL]

Attest:

GERALD J. MOSSINGHOFF

Attesting Officer    Commissioner of Patents and Trademarks